UNITED STATES PATENT OFFICE.

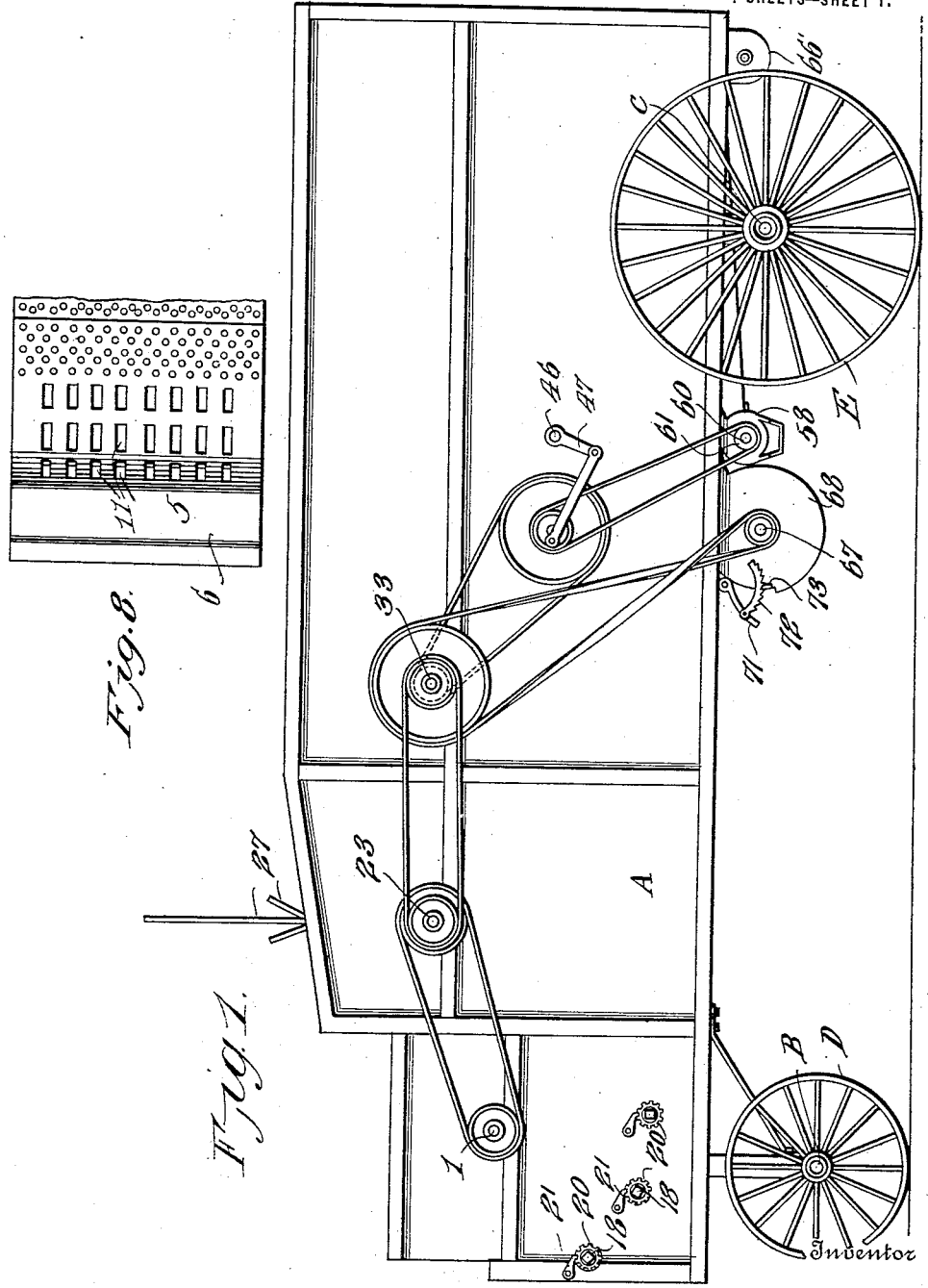

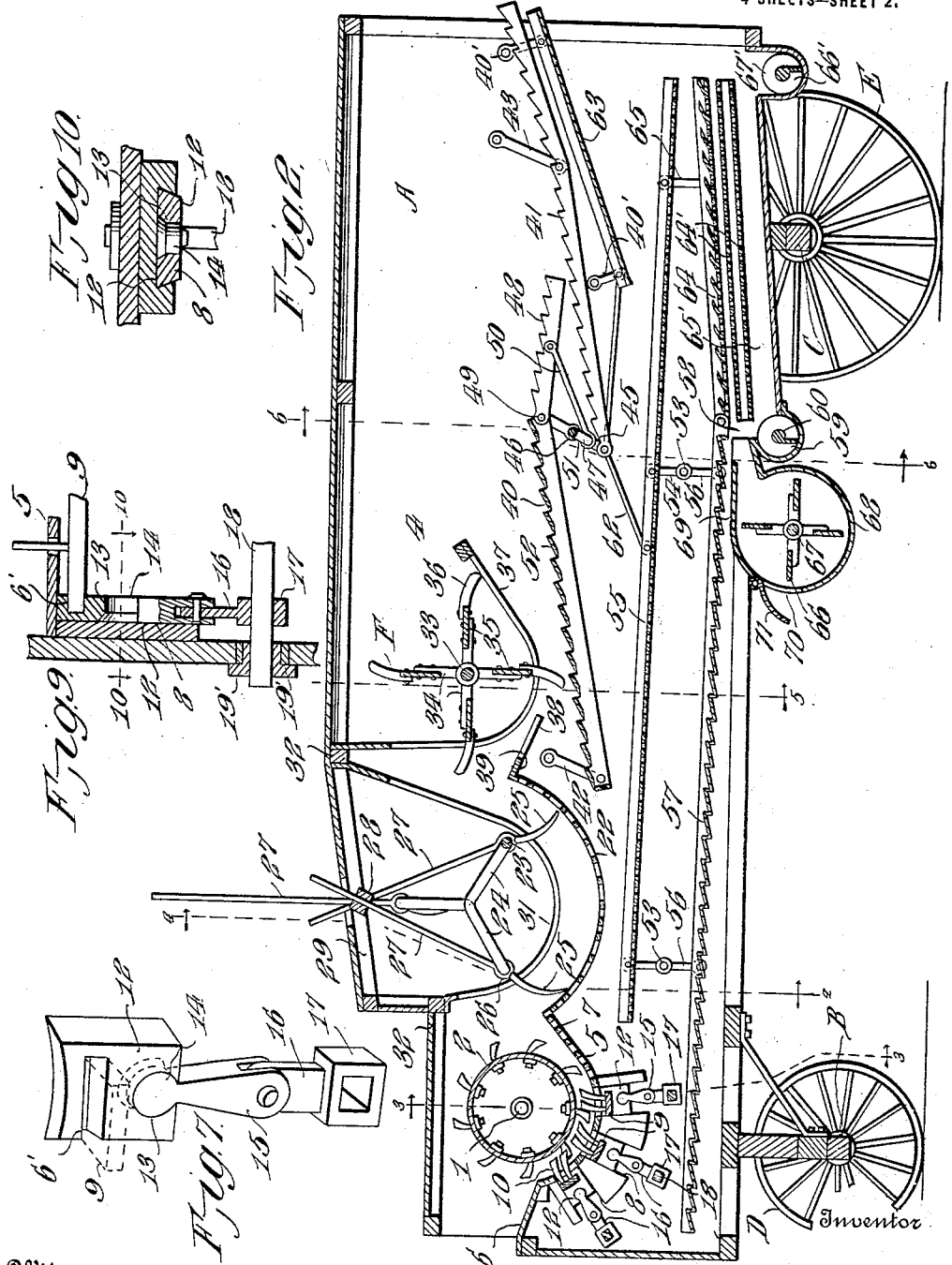

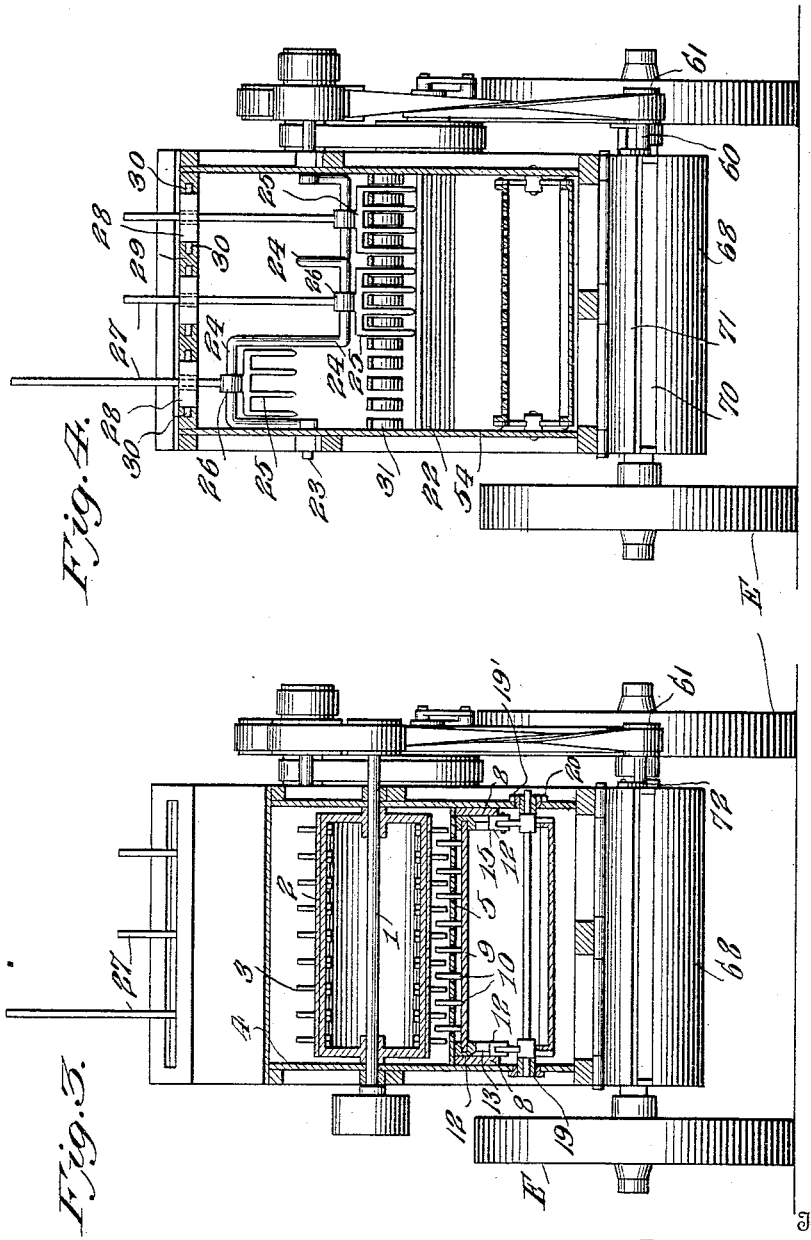

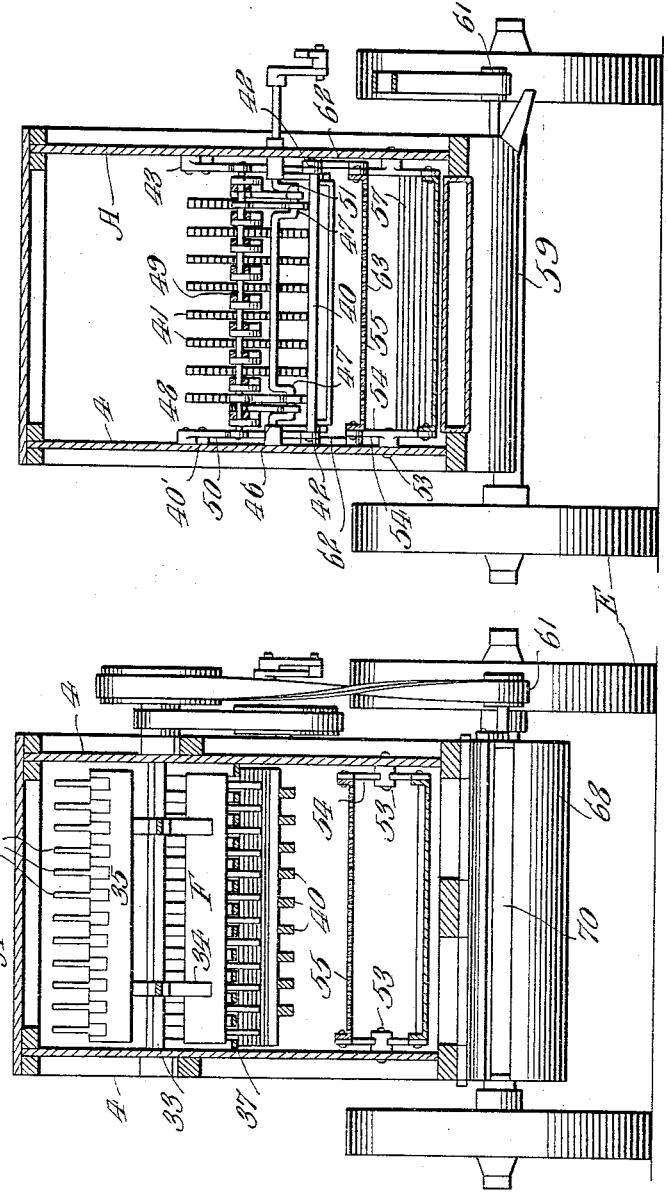

DAVID LUCAS, OF MADISON, KANSAS.

THRESHING-MACHINE.

1,158,944.   Specification of Letters Patent.   Patented Nov. 2, 1915.

Application filed March 29, 1911. Serial No. 617,664.

*To all whom it may concern:*

Be it known that I, DAVID LUCAS, a citizen of the United States, residing at Madison, in the county of Greenwood and State of Kansas, have invented new and useful Improvements in Threshing-Machines, of which the following is a specification.

This invention relates to threshing machines and grain stackers, and it has for its object to provide an improved construction of separating mechanism whereby the grain shall be separated from the straw and chaff at an early stage, thus lightening the work of the machine.

In the drawings,—Figure 1 is a side elevation of a threshing machine constructed in accordance with the invention. Fig. 2 is a longitudinal vertical sectional view of the same. Figs. 3, 4, 5 and 6 are transverse sectional views taken on the planes indicated by the lines 3—3, 4—4, 5—5 and 6—6 in Fig. 2. Fig. 7 is a perspective detail view showing the end of one of the concave bars and the adjusting mechanism for the same. Fig. 8 is a detail plan view of the concave. Fig. 9 is a sectional detail view, enlarged, taken through one side of the casing and the end of one of the concave bars and adjusting means. Fig. 10 is a sectional detail view taken on the line 10—10 in Fig. 9.

Corresponding parts in the several figures are denoted by like characters of reference.

The frame or casing A of the improved machine is supported for transportation upon front and rear axles B, C having transporting wheels D and E. The main shaft 1 which carries the threshing cylinder 2 is supported for rotation in suitable bearings adjacent to the front end of the casing. The threshing cylinder is provided in the usual manner with teeth 3 which may be constructed and mounted upon the cylinder in any suitable and convenient well known manner.

Supported between the side walls 4 of the casing, beneath the cylinder 2, is a grate 5 a portion of which is concentric with the cylinder. Said grate, however, includes a forwardly extending feed board 6 over which the grain to be operated upon is fed to the machine. The grate also includes a rearwardly extending screen portion 7. The grate 5 may be regarded as forming the body portion of the concave, and adjacent to the under face of said grate the sides of the casing of the machine are provided with dovetailed guides 8, for the reception of slides 12 provided near their upper edges with grooves or recesses 6', wherein the ends of the concave bars 9 are detachably fitted, the front ends of said recesses being normally obstructed by the guides 8, whereby the bars 9 will be retained when the parts are assembled. Said concave bars are provided with teeth 10 extending through slots 11 in the grate 5, thus enabling the concave bars to be radially adjusted with reference to the axis of the cylinder 2, the teeth 3 of said cylinder being adapted to coöperate with the teeth 10 of the concave bars for the purpose of detaching the kernels from the heads or ears of the grain which is fed to the machine.

The slides 12 supporting the concave bars 11 are adapted to be engaged by the adjusting mechanism whereby the concave bars are adjusted radially with reference to the cylinder. The said slides carrying the concave bars are provided with recesses 13 engaged by round heads 14 formed upon links 15 which are pivotally connected with arms 16 extending from hubs 17 which are mounted upon non-circular shafts 18 that extend through sleeves 19 and 19' that are supported for rotation in the sides of the casing. The sleeves 19' are equipped with toothed wheels 20 adapted to be engaged by pawls or dogs 21 upon the outer side of the casing of the machine, and whereby the non-circular shafts may be held securely at various adjustments. The projecting ends of the shafts 18 enable said shafts to be conveniently manipulated by means of an ordinary wrench, whereby said shafts may be partly rotated, thus enabling the concave bars to be moved inward or outward with reference to the axis of the threshing cylinder, as will be readily understood, said concave bars being capable of being secured independently of one another at various adjustments. It follows that all of the concave bars may be moved inwardly in such a manner as to cause the teeth 10 to project inwardly through the slots 11 in the grate 5, as shown most clearly in Fig. 2 of the drawings, or said concave bars may be moved outwardly until all of the teeth are moved out of the path of the teeth 3 of the threshing cylinder. Again, the concave bars may be so adjusted that the teeth of some of said bars will be located in the path of the teeth of the cylinder, while others are not, the teeth of said concave bars being variously positioned according to the kind and condition of grain that is to be operated upon.

It will be readily understood that any suitable and convenient number of concave bars may be used, no limitation being made to the precise number shown in the drawings hereto annexed. It will also be understood that the concave bars may be variously positioned with reference to the threshing cylinder within the scope of the invention.

By the construction herein described it will be readily seen that several important advantages are gained. The non-circular rock shafts 18 may consist of bars of square cross section on which the hubs 17 having the radial arms 16 will be securely held against rotation without the use of keys or splines. The sleeves 19 and 19' which are fitted upon the ends of the bars 18 serve to support said bars for oscillation on the frame of the machine. The parts may very readily be assembed or disassembed, including the links 15, the round heads of which may be readily disengaged from the slides 12, when desired, thus enabling said slides to be moved to a position where the bars 9 may be readily detached by simply sliding them from the recesses 6'. When the parts are assembled in position for operation, the bars 9 will be retained securely in the recesses by the guides 8 which obstruct the front ends of said recesses.

22 designates an arcuate screen which extends rearwardly from the rear edge of the rearward extension 7 of the grate 5, said arcuate screen being concentric with a shaft 23, the latter being supported for rotation in the sides of the casing. The shaft 23 is provided with a plurality of cranks 24 which are preferably equidistantly disposed around the axis of the shaft. Each of the cranks 24 carries a rake 25, the head of which has a loop or eye 26 mounted for oscillation upon the crank. The loop or eye which constitutes the bearing of each rake is provided with an upwardly extending arm or handle 27 slidably engaging an apertured block 28 which is supported for oscillatory movement in the frame or casing of the machine. Under the construction illustrated in Figs. 2 and 4 of the drawings, the frame or casing includes longitudinal bars 29 suitably spaced apart and provided with recesses affording bearings for the trunnions 30 upon the blocks 28 which are thus supported for oscillation, as described. It will be readily seen that when the shaft 23 rotates, the rakes 25 will be moved orbitally around the axis of the shaft, the parts being so proportioned that said rakes will almost engage the curved screen 22, thus causing the straw to be moved rearwardly over said screen by the action of the rakes. It will also be noted that owing to the spacing of the cranks 24 upon the shaft 23, the several rakes will engage the straw in succession, so that only a portion of the straw will be moved at any one time by one of the rakes, thus facilitating the operation and also causing the straw to be thoroughly agitated and separated by the action of said rakes, such agitation and separation being extremely effective in separating the grain which is permitted to pass through the screen 22. A shield 31 is provided to coöperate with the rakes said shield being composed of a plurality of curved or arcuate bars, the terminal ends of which are suitably attached to or connected with cross bars 32 of the frame or casing, while the lower portions of said curved or arcuate bars are substantially concentric with the screen 22. The shield composed of the bars 31 will prevent the straw from becoming entangled with the cranks 24 and the shaft 23, no matter how rapidly the latter may be rotated. The shield also coöperates with the screen 22 to constitute a throat or passage for the straw which will thus be prevented from being scattered promiscuously through the interior of the casing.

As will appear by the foregoing description and by reference to the drawings, the arcuate screen 22 is connected at its front edge with the rear edge of the screen portion 7 of the arcuate concave 5, said screen portion 7 being inclined in an upward and rearward direction, while the forward portion of the screen 22 is inclined in an upward and forward direction. A distinct elevated ridge will thus be formed between the threshing concave and the arcuate screen 22 over which the threshed material must be thrown by the action of the threshing cylinder, said material being thus subjected to a distinct drop or fall on to the screen 22. In order to pass over the ridge between the threshing concave and the screen 22, the material must thus necessarily be subjected to a very violent agitation which, especially at this early stage of the operation, is extremely effective in separating the grain from the straw and chaff, and correspondingly facilitating that portion of the separating process which is to be subsequently performed. It will also be observed that the front portions of the curved bars constituting the shield 31 are disposed directly in rear of the threshing cylinder and that the curved portions of said bars extend downwardly below the ridge portion between the threshing concave and the screen, thus positioning said shield bars directly in the path of material thrown rearwardly by the action of the threshing cylinder, intercepting and checking said material which will then drop upon the screen, thereby greatly increasing the efficiency of the separating operation.

Supported for rotation in the sides of the casing in rear of the shaft 23 is a shaft 33 carrying a fan F which is composed of radial arms 34 carrying fan blades 35, said blades having radially extending fingers 36 which project through the spaces intermediate a series of suitably supported curved or arcuate bars 37 which constitute a housing for the fan. The functions of this fan are three-fold. Primarily, it constitutes a conveyer whereby the straw passing over the sieve or screen 22 is conveyed rearwardly in the casing of the machine. Secondly, it constitutes a beater, the fingers 36 being adapted to coöperate with spaced fingers 38 that extend downwardly and rearwardly from the rear edge of the screen 22, said fingers being connected with a cross bar 39. Thirdly, the fan operates to agitate the air within the upper portion of the casing of the machine and to move in a rearward direction the loose chaff, dust and the like without permitting the same to settle upon the straw carriers and thereby interfering injuriously with the operation of the machine to separate the grain from the waste material.

Straw carriers 40 and 41 are supported for reciprocation within the casing by means of links 42 at the front end of the carrier 40 and links 43 near the rear end of the carrier 41. The rear end of the front carrier 40 slightly overlaps the forward end of the rear carrier 41 which are connected with and supported by arms 44 and 45 extending radially from a rock shaft 46 which is supported for rotation in the sides of the casing and which is provided at one end with a crank 47. Pivotally connected with the rear end of the straw carrier 40 are a plurality of ratchet bars 48 which are suitably connected together by a cross bar 49, the latter being connected by means of links or pitmen 50 with crank arms 51 extending from the shaft 46. It will be seen that when the latter is oscillated, reciprocatory movement in opposite directions will be imparted to the straw carriers 40 and 41, while the ratchet bars 48 will be vibrated vertically independently of the movement of the carrier 40 with which they are connected. By the reciprocatory movement of the carriers 40 and 41, which are of the ordinary ratchet or fishback pattern, the straw will be moved rearwardly within the casing of the machine, being subjected the while to a thorough separation from the grain which is permitted to escape downwardly over the inclined cross bars 52 which constitute part of the straw carriers. By the independent vibratory movement of the ratchet bars 48, the straw as it passes from the carrier 40 on to the carrier 41 will be subjected to an additional tossing or shaking, whereby the efficiency of the separating action will be promoted.

Supported for oscillation in the sides of the casing are rock shafts 53 having upwardly extending arms 54 carrying the chaffing screen 55 and downwardly extending arms 56 carrying the grain pan 57, said chaffing screen and grain pan being supported in approximately parallel relation and disposed to incline downwardly and rearwardly, as shown. The grain pan is adapted to discharge at its rear end into a transversely disposed trough or casing 58 wherein a spiral conveyer 59 is mounted for rotation upon a shaft 60 having at one end a pulley 61. Oscillatory movement may be imparted to the screen 55 and pan 57 by means of links 62 leading from the screen to cranks 45 of the shaft 46 or in any other suitable and convenient manner.

Supported in the rear end of the casing beneath the rear straw carrier 41 by means of links 40' is a return grain board 63 which receives the grain separated through said carrier and discharges the same, together with dust, chaff and other waste material upon the chaffing screen 55. Hingedly connected with the rear end of the grain pan 57 is a short chaffer 64 supported near its free end by links 65. Supported beneath the chaffer 64 is a plurality of sieves 64' below which is a grain pan 65', the latter being tilted or inclined downwardly and forwardly to discharge into the conveyer trough 59. A tailings spout 66' containing a screw conveyer 67' is arranged at the tail end of the machine. A fan 66 supported upon a shaft 67 is arranged for rotation in a housing or casing 68 disposed transversely beneath the casing of the machine directly in front of the conveyer casing 59, said fan casing being provided with a discharge spout 69 through which the blast is discharged beneath the discharge end of the grain pan 57 and over the screens or sieves 64' and through the rear end of the chaffing screen 55 and the short chaffer 64. The fan casing or housing 68 has an inlet 70 in its front side, said inlet extending the entire width of the casing, and a valve 71 is hingedly supported to obstruct said inlet and to regulate the admission of air through said inlet to the casing. The valve 71 is provided with a ratchet bar 72 engaging a stop 73 upon one end of the casing whereby it may be supported at various adjustments, it being, however, understood that other suitable means may be employed for the purpose of adjusting and securing the said valve. By this construction it will be seen that I avoid the use of air inlets at the ends of the fan casing or housing, the air being taken from beneath the casing of the machine. Owing to this arrangement the fan will operate efficiently without regard to the direction of the wind when the machine is in operation, and the separating action will be unobstructed by fluctuations in the air current arising from external sources.

From the foregoing description, taken in connection with the drawings hereto annexed, the operation and advantages of this invention will be readily understood by those skilled in the art to which it appertains. The grain is fed to the machine in the usual manner, the concave bars having been previously adjusted according to the nature and condition of the grain in such a manner that the most satisfactory result will be attained. A portion of the grain will be separated through the screen 7 and will drop upon the front end of the chaffing screen. The straw with the remaining loose grain will be discharged over the screen 7 on to the arcuate screen 22 where the straw is agitated and carried in a rearward direction by the action of the rakes 25, separation of the grain from the straw being effected through the screen 22 from which the grain will drop on to the chaffing screen. As the straw is discharged from the screen 22 over the downwardly and rearwardly extending fingers 39 it is subjected to a further beating and loosening action by the fingers 36 projecting from the wings or blades 35 of the fan F, the straw being discharged over the fingers 38 on to the front carrier 40. From the latter it passes over the vibratory ratchet bars 48 on to the rear carrier 41 and over which it is discharged at the tail end of the machine. Separation of grain, chaff, loose bits of heads with grain adhering thereto and the like will continue while the straw passes over the carriers 40 and 41 from which the grain together with some waste materials will pass to the sieve 63, chaffing screen 55, short chaffer 64 and to the sieves 64', the grain being eventually discharged from the grain pans 57 and 65' and from the sieve 64 into the conveyer trough 59, being at the same time subjected to the cleansing action of the blast from the fan casing 68, whereby the chaff, dust and worthless material will be blown out through the tail end of the casing, except such relatively heavy parts as drop into the tailings spout 66'.

It is desired to be understood that under this invention the return grain board 63 and the sieve 64', together with the grain pan 65', may be supported by means of a movable shoe such as is well known in machines of this character, but the same has not been illustrated because the use thereof is not only well known, but is not deemed absolutely essential to the successful operation of this machine.

The improved threshing machine and grain separator herein described may be used for threshing and separating various kinds of grain, such as wheat, rye and oats, as well as clover, millet and the like, it being possible to adjust the concave bars according to the various kinds of grain that is to be operated upon and also according to the condition of such grain whether it be wet or dry, straight or tangled, and success in the threshing operation will thus be insured. It is obvious that sieves or screens of various grades may be utilized according to the character of work to be performed.

Having thus described the invention, what is claimed as new, is:—

In a threshing machine a frame including spaced bars extending longitudinally thereof, blocks provided at their opposite ends with trunnions which are pivoted in the bars, said blocks being located in the spaces between the bars with their ends in close proximity to the sides of the bars whereby the said bars hold the blocks against longitudinal movement, a crank shaft journaled below the bars and blocks, rakes pivotally mounted upon the cranks of the shafts and handles attached to the rakes and passing through the blocks between the trunnions thereof and slidably mounted in the blocks.

In testimony whereof I affix my signature in presence of two witnesses.

DAVID LUCAS.

Witnesses:
F. D. LOSE,
H. P. HORST.

Copies of this patent may be obtained for five cents each, by addressing the "Commissioner of Patents, Washington, D. C."